(12) United States Patent
Robertson et al.

(10) Patent No.: US 12,124,085 B2
(45) Date of Patent: Oct. 22, 2024

(54) MULTIPLE WAVELENGTH BAND OPTICAL SWITCHING UNIT

(71) Applicant: Huber+Suhner Polatis Limited, Cambridge (GB)

(72) Inventors: Brian Robertson, Cambridge (GB); Daping Chu, Cambridge (GB); Haining Yang, Nanjing (CN)

(73) Assignee: HUBER+SUHNER POLATIS LIMITED, Cambridge (GB)

( * ) Notice: Subject to any disclaimer, the term of this patent is extended or adjusted under 35 U.S.C. 154(b) by 75 days.

(21) Appl. No.: 17/255,206

(22) PCT Filed: Jun. 19, 2019

(86) PCT No.: PCT/GB2019/051709
§ 371 (c)(1),
(2) Date: Dec. 22, 2020

(87) PCT Pub. No.: WO2019/243809
PCT Pub. Date: Dec. 26, 2019

(65) Prior Publication Data
US 2021/0263218 A1 Aug. 26, 2021

(30) Foreign Application Priority Data
Jun. 22, 2018 (GB) .................................. 1810297

(51) Int. Cl.
*G02B 6/293* (2006.01)
*G02B 6/35* (2006.01)
(Continued)

(52) U.S. Cl.
CPC ............ *G02B 6/293* (2013.01); *G02B 6/356* (2013.01); *G02F 1/29* (2013.01); *H04B 10/50* (2013.01);
(Continued)

(58) Field of Classification Search
CPC ............ G02B 6/293; G02B 6/356; G02F 1/29; H04B 10/50; H04J 14/021; H04J 14/02;
(Continued)

(56) References Cited

U.S. PATENT DOCUMENTS 5,724,165 A * 3/1998 Wu .................... H04Q 11/0005
398/55
7,113,279 B2 * 9/2006 Liu ........................ G02B 6/272
356/365

(Continued)

FOREIGN PATENT DOCUMENTS

EP 3318906 5/2018
EP 3647844 5/2020
(Continued)

OTHER PUBLICATIONS

"GB Application No. 1810297.0 Examination Report, mailed Feb. 4, 2022", 4 pages.
(Continued)

*Primary Examiner* — Leslie C Pascal
(74) *Attorney, Agent, or Firm* — Kilpatrick Townsend & Stockton LLP

(57) ABSTRACT

An input device for a multiple wavelength band optical switch comprising: an optical demultiplexer configured to receive light and disperse the received light along a dispersion axis; and a light director configured to direct light in a first wavelength band to the optical demultiplexer at a first angle of incidence and to direct light in a second wavelength band to the optical demultiplexer at a second angle of incidence, the second angle of incidence being different from the first: wherein the difference between the first and second angles of incidence causes the demultiplexer to output dispersed spectra of light corresponding to the first and second bands such that the dispersed spectrum corresponding to the first band is overlapped along the dispersion
(Continued)

axis and separated along a switch axis relative to the dispersed spectrum corresponding to the second wavelength band, the switch axis being perpendicular to the dispersion axis.

15 Claims, 7 Drawing Sheets

(51) Int. Cl.
G02F 1/29 (2006.01)
H04B 10/50 (2013.01)
H04J 14/02 (2006.01)
H04Q 11/00 (2006.01)

(52) U.S. Cl.
CPC ........ *H04J 14/021* (2013.01); *H04Q 11/0005* (2013.01); *H04Q 2011/0016* (2013.01); *H04Q 2011/0026* (2013.01); *H04Q 2011/0032* (2013.01); *H04Q 2011/0035* (2013.01)

(58) Field of Classification Search
CPC ....... H04Q 11/0005; H04Q 2011/0016; H04Q 2011/0026; H04Q 2011/0032; H04Q 2011/0035; H04Q 11/0001
See application file for complete search history.

(56) References Cited

U.S. PATENT DOCUMENTS

| | | | |
|---|---|---|---|
| 9,467,755 B2* | 10/2016 | Suzuki | H04Q 11/0005 |
| 2007/0211987 A1* | 9/2007 | Koyama | G02F 1/133553 |
| | | | 385/24 |
| 2009/0040615 A1 | 2/2009 | Koeppen et al. | |
| 2009/0220233 A1* | 9/2009 | Presley | G02B 6/3544 |
| | | | 398/48 |
| 2014/0285867 A1 | 9/2014 | Wagener | |
| 2015/0023662 A1 | 1/2015 | Suzuki et al. | |
| 2015/0268421 A1* | 9/2015 | Higuchi | G02B 6/2938 |
| | | | 385/17 |

FOREIGN PATENT DOCUMENTS

| | | | |
|---|---|---|---|
| WO | WO-2017051157 A1 * | 3/2017 | H04J 14/021 |
| WO | 2018104725 | 6/2018 | |
| WO | 2018123921 | 7/2018 | |

OTHER PUBLICATIONS

"GB Application No. 1810297.0 Search Report, mailed Dec. 20, 2018", 3 pages.

"International Search Report for PCT Application No. PCT/GB2019/051709 mailed Sep. 30, 2019", 13 pages.

* cited by examiner

MULTIPLE WAVELENGTH BAND OPTICAL SWITCHING UNIT

FIELD

This invention relates to a multiple wavelength band optical switching unit.

BACKGROUND

Wavelength selective switches (WSSs) are components used in wavelength-division multiplexing (WDM) systems in optical communications networks to selectively switch optical signals by wavelength. The practice of WDM multiplies the available capacity of optical fibres by multiplexing several wavelengths and transmitting the combined signal through a single optical fibre. The combined signal can then be demultiplexed into its constituent wavelengths as needed in receiving equipment.

Modern WSSs often receive an optical signal via an input optical fibre and use a demultiplexer to disperse the input optical signal into constituent wavelengths. This dispersed light is then directed to a liquid crystal on silicon (LCOS) device which serves as a spatial light modulator. In the field of WSS design, the term spatial light modulator refers to the controllable surface, portions of which can be used to independently steer and/or attenuate incident light. LCOS devices comprise a configurable array of sub-holograms, wherein each sub-hologram is configurable to steer a respective wavelength of the input light as desired. The LCOS device will generally steer the various wavelengths towards a selected output optical fibre.

One common use of WSSs is to implement a configurable optical add-drop multiplexer (ROADM) which allows individual or multiple wavelengths to be added to and/or dropped (removed) from an optical fibre without the need to convert the signals on all of the WDM channels to electronic signals and back again to optical signals.

Optical communication systems regularly employ light in the C-band (conventional band: 1530-1565 nm) as this band has low transmission losses in optical fibres. In order to address the ever-increasing capacity demand in modern telecommunications and data centre interconnecting (DCI) networks, network operators have begun to transmit signals in the L-band (long-wavelength band: 1565-1625 nm) in addition to the C-band. However, there is a lack of viable WSSs that are able to switch both optical signals in the L-band and the C-band. Thus, network operators need to separate the signals from these two bands into two separate fibres and feed the signals to two different WSSs—one WSS that can switch L-band signals and one that can switch C-band signals.

An exemplary system of this type is shown in FIG. 1. Specifically, FIG. 1 shows a ROADM 100 that comprises four sets of C- and L-band input signals which are received at a respective demultiplexer (demux) 102. Each demux 102 separates the C-band signal from the L-band signals and provides the C-band signals to a C-band input WSS 104 and the provides the L-band signals to an L-band WSS 106. A connecting matrix 108 comprising a plurality of optical fibres guides signals from each C-band input WSS 104 to the various C-band output WSSs 110; and guides signals from each L-band input WSS 106 to the various L-band output WSSs 112. C- and L-band signals from each output pair of output WSSs 110 and 112 can then be recombined by a multiplexer (mux) 114. It is the input and output WSS 104, 106, 110, 112 that collectively perform the adding and dropping of signals as required in a specific implementation.

Using separate WSSs for the C-band and separate WSSs for the L-band is undesirable from the perspectives of component footprint, thermal management, cost and protection. In this context, protection refers to building redundancy into a switch node through the use of additional WSSs.

WSSs that can switch C-band and L-band have been proposed, however these systems have certain problems. This is because LCOS devices do not generally have a sufficient number of pixels (sub-holograms) along a single axis to ensure the necessary performance across the whole wavelength ranges. This is in part due to the fact that LCOS devices used in telecommunication applications are typically based on the silicon chip and addressing scheme of a display device, for example HD, 2K or 4K video displays, as there has not been sufficient demand for a manufacturer to design and produce custom LCOS panels for telecoms. FIG. 2 shows a multiple wavelength band WSS 200 known to the Applicant. The WSS 200 if FIG. 2 is able to switch optical signals in two bands—B1 and B2. This WSS 200 comprises a collimated optical fibre input port for inputting light that comprises wavelengths from both the B1 and B2 bands. Lens 201 converts the position of an input beam (i.e. its position in the xy-plane) into a unique propagation angle (i.e. the angle between the direction of propagation and the z-axis). The input light is focused by a lens L1 202 onto a demux 204, which disperses the light such that the B1 and B2 bands are spatially separated. The WSS 200 is viewed in the xz-plane, where the x-axis is the axis along which dispersion caused by the demux 204 occurs. Lens L2 205 then focusses the dispersed light onto an LCOS arrangement 206. The WSS 200 bypasses the circumvents of a single LCOS device not having sufficient pixels along a single axis by using two adjacent LCOS devices 206. However, as can be seen in FIG. 2, some portion of the dispersed light will not be incident on either LCOS device 206 but instead falls in the gap between the active surfaces of the two LCOS devices. This results in a substantial portion of the spectrum being unusable for data optical communication. Furthermore, the WSS 200 of FIG. 2 requires lens L2 205 to have a small F number (the ratio of focal length to lens diameter) to accommodate both wavelength bands, further increasing the complexity and cost of the WSS 200. Smaller F numbers are disadvantageous as the aberrations, and hence optical performance, of a lens depend strongly on F number.

There is a need for a system that at least partially address some of these problems.

SUMMARY OF THE INVENTION

According to the present invention there is an input device for a multiple wavelength band optical switch comprising: an optical demultiplexer configured to receive light and disperse the received light along a dispersion axis; and a light director configured to direct light in a first wavelength band to the optical demultiplexer at a first angle of incidence and to direct light in a second wavelength band to the optical demultiplexer at a second angle of incidence, the first angle of incidence being different from the first angle of incidence; wherein the difference between the first and second angles of incidence causes the optical demultiplexer to output dispersed spectra of light corresponding to the first and second wavelength bands such that the dispersed spectrum of light corresponding to the first wavelength band is overlapped along the dispersion axis and separated along a switch axis relative to the dispersed spectrum of light corresponding to the second wavelength band, the switch axis being perpendicular to the dispersion axis.

The first and second angles of incidence may be angled relative to one another with respect to a first axis and a second axis, the first and second axes being parallel with an incident surface of the optical demultiplexer and perpendicular to one another.

The dispersion axis may be parallel with the incident surface of the optical demultiplexer and the first axis may be parallel with the dispersion axis.

The light director may comprise a first optical waveguide configured to direct light in the first wavelength band to the optical demultiplexer and a second optical waveguide configured to direct light in the second wavelength band to the optical demultiplexer.

The first optical waveguide may be spatially offset from the second optical waveguide along a first axis and a second axis, the first and second axes being parallel with an incident surface of the optical demultiplexer and perpendicular to one another.

The first and second optical waveguides may be angled relative to one another such that light that exits the first optical waveguide has the first angle of incidence and light that exits the second optical waveguide has the second angle of incidence.

The light director may comprise a first array of multiple optical waveguides and a second array of multiple optical waveguides, and wherein the first array of multiple optical waveguides comprises the first optical waveguide and the second array of multiple optical waveguides comprises the second optical waveguide.

The light director may further comprise a lens situated between the optical waveguides and the optical demultiplexer, the lens configured to receive light in the first and second wavelength bands from the first and second optical waveguides and steer the received light toward the optical demultiplexer such that light in the first wavelength band has the first angle of incidence and light in the second wavelength band has the second angle of incidence.

The light director may comprise a first array of multiple optical waveguides and a second array of optical waveguides, and wherein the first array of multiple optical waveguides comprises the first and second optical waveguides and the second array of multiple optical waveguides comprises one or more output optical waveguides.

The light director may further comprise a first lens situated between the optical waveguides and the optical demultiplexer, the first lens configured to receive light in the first and second wavelength bands and steer the received light towards the optical demultiplexer such that light in the first wavelength band has the first angle of incidence and light in the second wavelength band has the second angle of incidence; and the input device further comprises a second lens configured to receive light in the first and second wavelength bands from the optical demultiplexer and steer the received light towards the output optical waveguides in the second array of multiple optical waveguides.

The optical waveguides in the first and second arrays of multiple optical waveguides may be arranged in one of: a linear or a rectangular pattern.

Each optical waveguide may comprise an optical fibre.

The optical demultiplexer may comprise a diffraction grating. The dispersion axis may be perpendicular to gratings of the diffraction grating.

The optical demultiplexer may comprise a prism.

The first wavelength band may be the C-band and the second wavelength band is the L-band.

There is also provided a multiple wavelength band optical switch comprising the input device as described above.

The multiple wavelength band optical switch may further comprise a liquid crystal on silicon spatial light modulator controllable to direct or attenuate light in the first and second wavelength bands; and wherein the difference between the first and second angles of incidence cause the optical demultiplexer to output dispersed spectra of light corresponding to the first and second wavelength bands such that the dispersed spectrum of light corresponding to the first wavelength band is overlapped along the dispersion axis and separated along the switch axis relative to the dispersed spectrum of light corresponding to the second wavelength band at an incident surface of the liquid crystal on silicon spatial light modulator.

The multiple wavelength band optical switch may further comprise a birefringent crystal and a polarisation rotator, wherein the birefringent crystal is arranged to divide light in the first and second wavelength bands into orthogonal polarisation components and the polarisation rotator is configured to rotate one polarisation component such that light incident on the liquid crystal on silicon spatial light modulator is substantially linearly polarised.

The polarisation rotator may comprise at least one of: a patterned half-wave plate, and a liquid crystal polarisation rotator.

The birefringent crystal and the polarisation rotator may be positioned adjacent to the liquid crystal on silicon spatial light modulator.

There is also provided a reconfigurable optical add-drop multiplexer comprising the multiple wavelength band optical switch as described above.

DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown but is to be accorded the widest scope consistent with the principles and features disclosed herein. As optical components are generally reversible, any terms that express directionality should be understood to be describing both possible directions. For example, a component labelled as an input may equally be used as an output etc.

Figure 3:
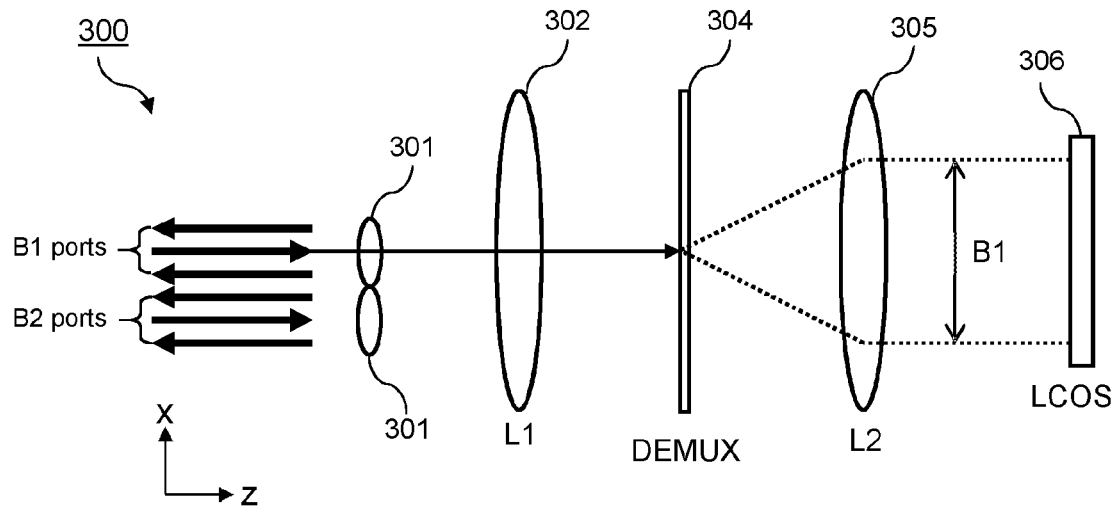
FIG. 3 shows a first exemplary optical switch viewed in the xz-plane showing the path of wavelength band B1.

FIG. 3 illustrates an exemplary WSS 300 viewed in the xz-plane. Light input into the WSS 300 will have been previously separated into its constituent wavelength bands by known means, such as one or more of a diffraction grating, a thin film filter, and a prism. Hence, optical waveguides, referred to herein as ports, for inputting and outputting light in two wavelength bands B1 and B2 to the WSS 300 are shown separated on the left-hand side of the figure. As light leaves the ports (i.e. when it enters the main body of the WSS) it may be collimated by a collimating lens (not shown). Only input light in band B1 is shown in FIG. 3.

In this example, Lens 301 converts the position of an input beam (i.e. its position in the xy-plane) into a unique propagation angle (i.e. the angle between the direction of propagation and the z-axis). Lens 301 will advantageously be spaced one focal length (of lens 301) away from the collimating lens. The input light then passes through a lens L1 302. Lens L1 302 converts the position of an input beam (i.e. its displacement along the x- or y-axis) into a unique propagation angle (i.e. the angle between the direction of propagation and the x- or z-axis). The beams are received on a demultiplexer (demux) 304. The demux 304 may be one or more of, for example, a diffraction grating, a prism, or a grating and prism combined in a grism. The gratings used may be ruled, holographic, echelle or transmission gratings. The demux 304 angularly separates the input beam by wavelength with the boundaries of the dispersed beam being represented by the dotted lines labelled B1.

The dispersed light of the B1 band is then focused by lens L2 305 and received on an LCOS device 306. An array of sub-holograms on the LCOS device 306 selectively steers the various wavelengths within band B1 back through the optics of the WSS towards the desired B1 output ports. The sub-holograms of the LCOS device 306 can act to individually steer or attenuate specific wavelength channels within a wavelength band.

Figure 4:
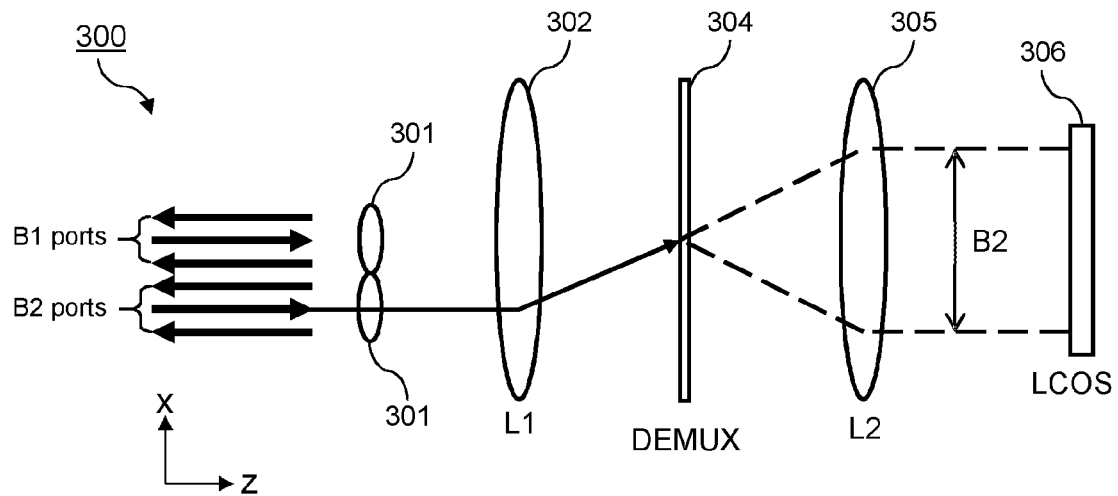
FIG. 4 shows the optical switch of FIG. 3 viewed in the xz-plane showing the path of wavelength band B2.

FIG. 4 illustrates the WSS 300 of FIG. 3 but instead shows only light from wavelength band B2. Light in band B2 generally follows the same path as the light in band B1 described above with reference to FIG. 3. However, the B2 input port is offset in the x-direction from the B1 input port. Thus, light from the B2 input port is incident on lens L1 302 at a location that is offset in the x-direction from the location the light from the B1 input port is incident on the lens L1 302. Thus, the lens L1 302 deflects the B2 beam by a different amount (or at a different angle) compared to the B1 beam. This causes the B1 and B2 beams to be incident on the demux 304 at different angles with respect to the x-axis or the z-axis (optical axis) when viewed in the xz-plane. In this example, the dispersion axis (an axis along which the demux disperses light) is parallel to the x-axis. In general, the dispersion axis will be the axis along which dispersion is greatest, but may be within 5, 10, 20 or 45 degrees of the axis of greatest dispersion.

Figure 1:
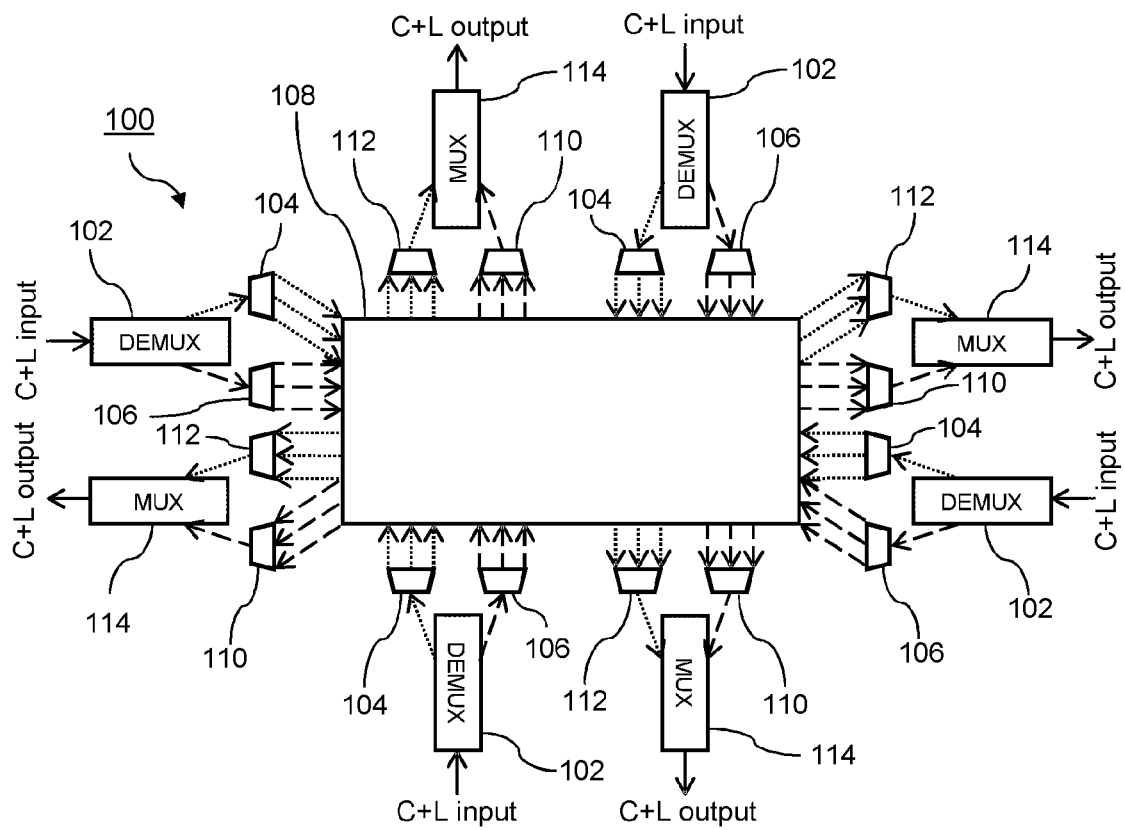
FIG. 1 shows a known design of ROADM.
Figure 2:
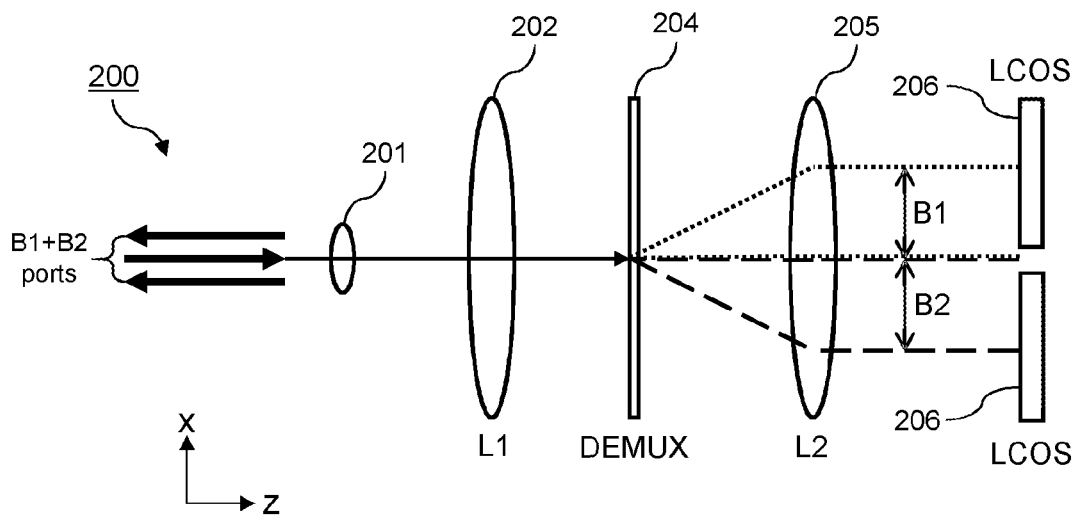
FIG. 2 shows a known design of WSS.

These differing angles of incidence on the demux 304 result in the dispersed B1 and B2 beams being incident on the LCOS device 306 over substantially the same x-range. This is in contrast to the known WSS 200 of FIG. 2, where the dispersed B1 and B2 beams are separated in the x-direction.

Figure 5:
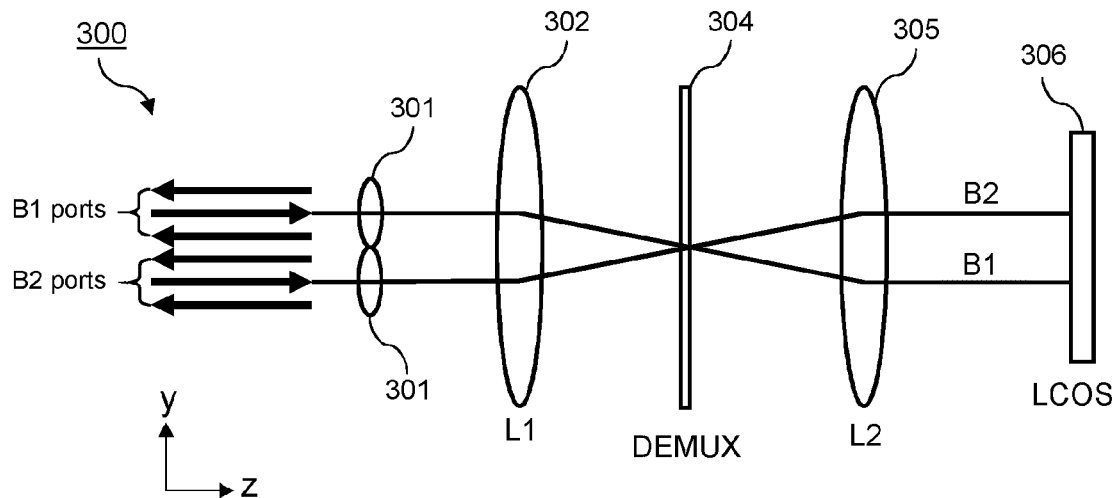
FIG. 5 shows the optical switch of FIGS. 3 and 4 viewed in the yz-plane showing the path of both wavelength bands B1 and B2.

FIG. 5 shows the WSS 300 in the yz-plane. The y-axis may be alternatively referred to as the WSS axis, switch axis or switching axis. As described above the beams are dispersed in the x-direction, thus the B1 and B2 beams do not appear deflected or dispersed when viewed in the yz-plane. It can be seen from FIG. 5 that the B1 ports and the B2 ports are also offset in the y-direction. Thus, as the B1 and B2 beams are incident on lens L1 302 at different positions along the y-axis, lens L1 302 imparts a different propagation angle (i.e. the angle between the direction of propagation and the z-axis) to each beam. This causes the beams output from the lens L1 302 to be incident on the demux 304 at different angles with respect to the y-axis (switch axis) or the z-axis (optical axis) when viewed in the yz-plane.

These differing angles of incidence on the demux 304 result in the dispersed B1 and B2 beams being incident on the LCOS device 306 at different locations in the y-direction.

Thus, a dispersed B1 beam will be incident on the LCOS at a different y-position but be dispersed across substantially the same range in x relative to the dispersed B2 beam.

Figure 6:
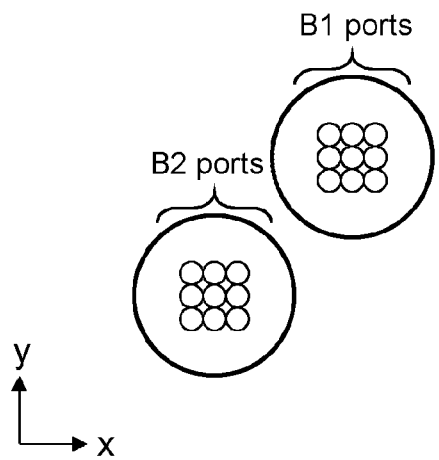
FIG. 6 shows an exemplary arrangement of the optical ports of the optical switch of FIGS. 3 to 5 viewed in the xy-plane.

FIG. 6 shows a view of the offset ports of FIGS. 3-5 in the xy-plane. In this example, each array of ports comprises 9 ports arranged in a grid pattern, though other arrangements are possible, such as linear port arrays and hexagonal port arrays.

Figure 7:
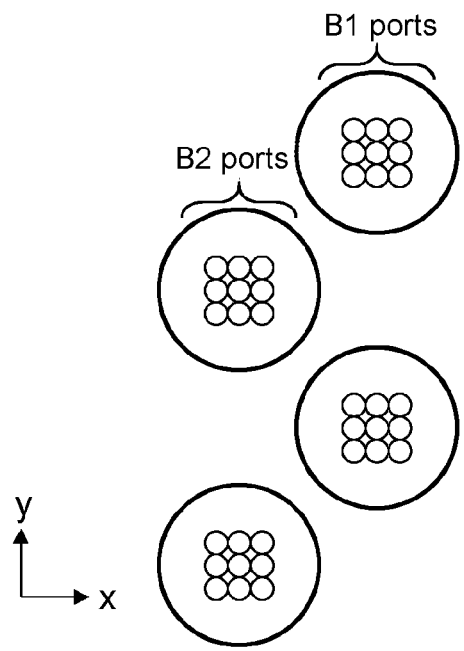
FIG. 7 shows a further exemplary arrangement of the optical ports of an optical switch viewed in the xy-plane.

Multiple arrays of ports may be used, as shown in FIG. 7. Such an arrangement would result in alternating dispersed B1 and B2 beams that incident on the LCOS device along the y-axis. There may be any number of arrays of ports and, though not shown, there may be an odd number of arrays of ports. Multiple LCOS devices may be used in a WSS comprising a plurality of arrays of ports. Such a system could be configured such that none of the spectrum is lost (as happens in the WSS 200 of FIG. 2) by ensuring that no dispersed beam falls between the gap between two adjacent LCOS devices by adjusting the y-position of the arrays of ports and/or the LCOS devices.

In the examples described above it is lens L1 302 that causes the B1 and B2 to have differing angles of incidence on the demux 306. However, the differing angles of incidence may also be achieved by angling the B1 input port relative to the B2 input port, such that the angle of incidence of the B1 beam on the demux 306 differs from the angle of incidence of the B2 beam on the demux 306 with respect to the x- and y-axis. In the case where each input port is accompanied by a collimating lens (not shown), the collimating lens may also be angled in the same manner as the port.

Figure 8:
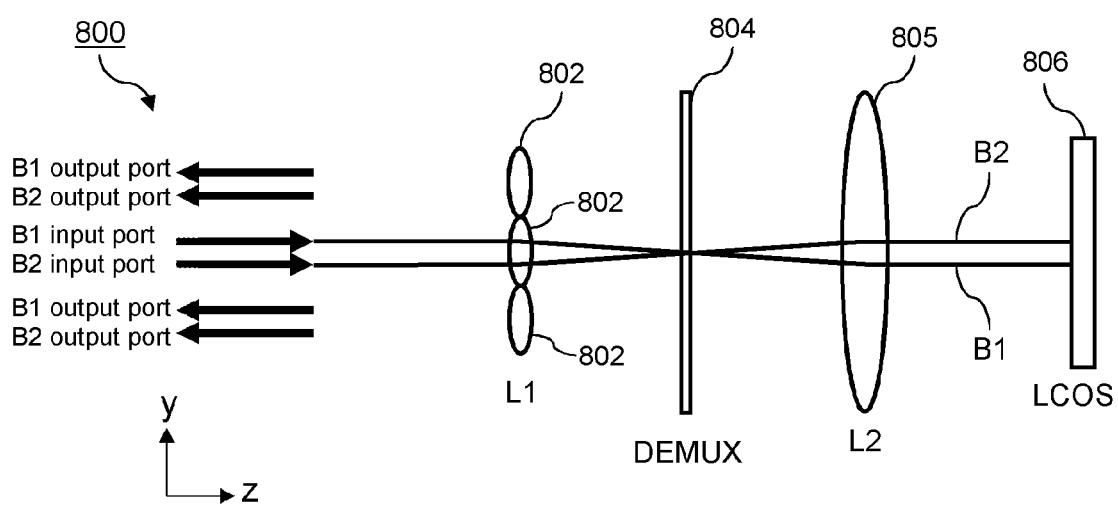
FIG. 8 shows an exemplary optical switch with grouped input and output ports.

FIG. 8 illustrates and alternative WSS 800. In the WSS 800 of FIG. 8 the input ports of all of the wavelength bands are grouped together into a single array. The output ports of all of the wavelength bands are grouped together into multiple arrays of ports. In this configuration, each array of ports directs light through a corresponding lens 802. Lenses 802 converts the position of an input beam (i.e. its position in the xy-plane) into a unique propagation angle (i.e. the angle between the direction of propagation and the z-axis).

Lens 802 will advantageously be spaced one focal length (of lens 802) away from the collimating lens. The dispersed light of the B1 and B2 bands are then focused by lens L2 805 and received on an LCOS device 306. The LCOS device 806 may be configured to selectively steer light (all of the light or just selected wavelength channels within the band) from the B1 input port to any of the B1 output ports. Similarly, the LCOS device 806 may be configured to selectively steer light (all of the light or just selected wavelengths within the band) from the B2 input port to any of the B2 output ports.

As the operation of the WSS 800 is generally reversible, the output ports may be used as input ports and vice versa. In the WSS 800 of FIG. 8, if the input ports shown were used as output ports and vice versa, light from the top and bottom ports could be steered by the LCOS device 806 and lens arrangement 802 such that this light combines at the demux 804 and is received by one of the central ports.

Figure 9:
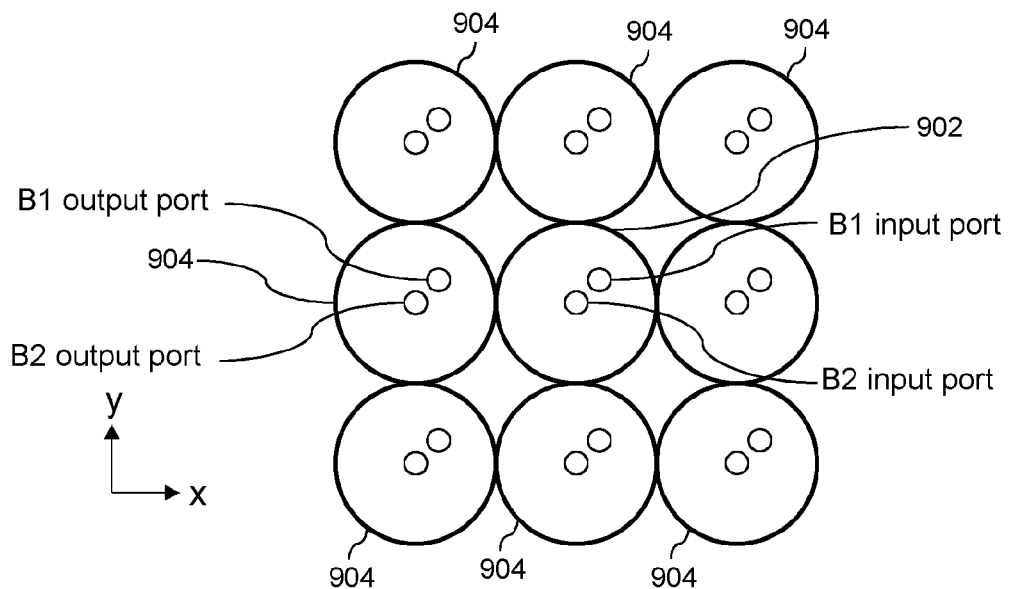
FIG. 9 shows an exemplary arrangement of the ports of an optical switch of the type shown in FIG. 8.

FIG. 9 shows a view of an arrays of ports (viewed in the xy-plane) for use in the WSS 800 of FIG. 8. In this example, an array of input ports 902 comprises a B1 input port and a B2 input port. The array of input ports 902 is surrounded by multiple arrays of output ports 904. Each array of output ports 904 comprises a B1 output port and a B2 output port.

Figure 10:
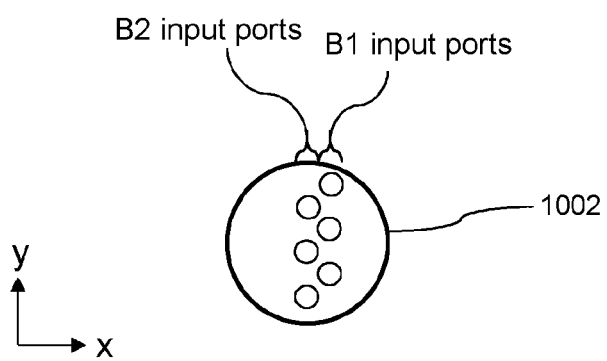
FIGS. 10 and 11 show further exemplary arrangements of the ports of an optical switch of the type shown in FIG. 8.
Figure 11:
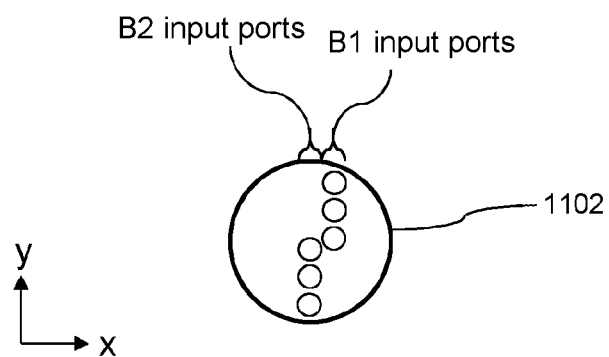

Each array of ports may comprise more than one port for a given wavelength band. FIGS. 10 and 11 show various arrangements of the ports within an input arrays 1002, 1102. Though not depicted, such arrays of input ports would be accompanied by multiple arrays of output ports. The output ports in these arrays may be arranged substantially the same as the input ports in the depicted array of input ports 1002 or 1102. Alternatively, the arrangement of the output ports in each array may be different from the arrangement of input ports.

The B1 and B2 bands may correspond to the C- and L-bands. Although the C- and L-bands are the two most commonly used band, it should be appreciated that any two different ranges of wavelengths may be used. These may be any of the telecommunication O-, E-, S-, C- or L-bands or may be outside of this range.

Figure 12:
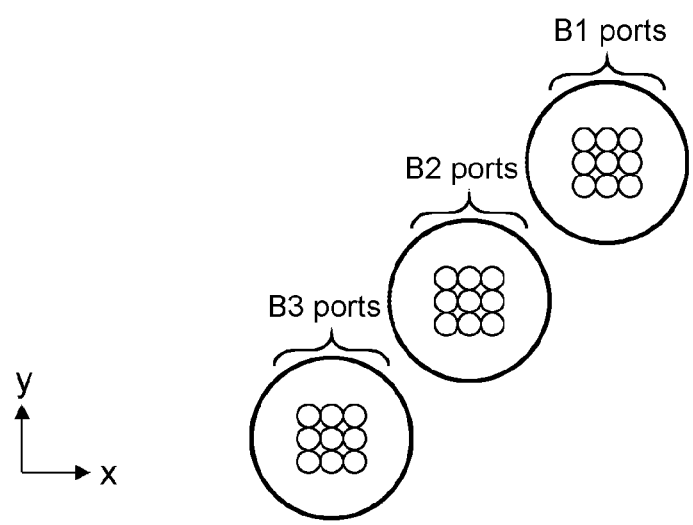
FIG. 12 shows an exemplary arrangement of the optical ports of the optical switch of FIGS. 3 to 5 viewed in the xy-plane, extended to a three optical band switch.

It should also be appreciated that the WSSs described may also be extended to be applied to systems using three or more wavelength bands. In such a case, the light in each wavelength band should have a different angle of incidence on the demux with respect to the x- and y-axis. A port arrangement for a WSS that makes use of three wavelength bands B1, B2 and B3 is shown in FIG. 12. As in FIGS. 3, 4 and 5, the port positions shown in FIG. 12 will require a lens L1 to ensure the differing angles of incident at a demux. As discussed above, similar results could be obtained by simply angling the B1, B2 and B3 ports such that a lens L1 is no longer needed to ensure the differing angles of incidence at the demux.

Since the beams of different wavelength bands have different incident and exiting angles with respect to the demux, the beams may have varied beam sizes along the x-axis, on the LCOS plane. This will lead to non-uniform performance across the range of wavelengths, which is undesirable. Therefore, it may be advantageous to include one or more beam shaping elements for each wavelength band. The beam shaping element may comprise an anamorphic optical system such as a pair of prisms or two arrays of cylindrical lenses. The beam shaping element may asymmetrically (i.e. not radially symmetrically) compress or stretch a beam profile. The arrangement of prism pairs may differ for various wavelength bands such that all of the beams have substantially the same properties when they are incident on the LCOS devices. A third prism may also be included for the purposes of aberration compensation. In arrangements such as those shown in FIGS. 3, 4 and 5, where input and output ports for a given band are grouped together, the beam shaping elements may comprise just one prism pair that is used to shape the beams entering and leaving all of the ports for a given wavelength band. Similarly, where input and output ports for a given band are grouped together, the aberration compensation optics may comprise just one prism that is used to compensate for the aberration in beams entering and leaving all of the ports for a given wavelength band.

Such beam shaping elements and/or aberration compensation optics may be placed adjacent to the ports or at any other location within the WSS, such as adjacent to the LCOS device.

Figure 13:
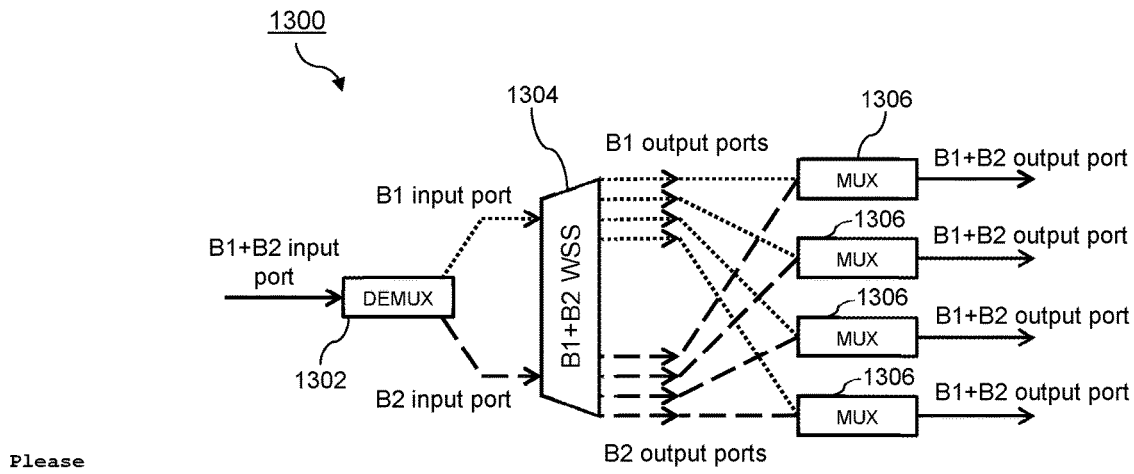
FIG. 13 shows an optical system comprising a switch of the type shown in FIGS. 3 to 5.

The system may also comprise a demux 1302 for separating the wavelength bands, prior to the switching, as shown in FIG. 13. This allows the WSS 1304 to interface with optical fibres carrying both wavelength bands. The system may also comprise one or more multiplexers (mux) 1306 for recombining output signals, as is also shown in FIG. 13. Though these multiplexers 1306 are shown as being distinct from the demux 1302, the B1 and B2 signals may simply be routed back through the initial demux 1302, which may perform the combining of the B1 and B2 signals.

Tilted Demux

In FIGS. 3, 4 and 5 the system is drawn on axis. The demultiplexing assembly may be used in a tilted geometry. In this tilted geometry, the demux no longer lies flat in the xy-plane, but is instead rotated about the y-axis. In the case where the demux is a diffraction grating, the gratings will generally lie along the y-axis. This arrangement results in the input and output beams being angularly separated by a large angle between L2 and the demux. Using an angled demux maximises dispersion.

The period of the sub-holograms can be optimized in order to ensure that the wavelength channels overlap at the grating in the xz-plane.

The WSS demux may also comprise several sub-demultiplexers. Using sub-demuxers removes the constraints imposed by having one planar demux. The sub-demuxers can be arranged independently. In one arrangement, each array of ports (input and output) may have a dedicated sub-demux.

Most demuxers will not disperse light such that wavelength channels are equally spaced at the SLM plane, i.e. the wavelengths are dispersed non-linearly. To compensate for this non-linear dispersion a prism, array of prisms, or a GRISM arrangement may be used. Such compensation components should have dispersion characteristics (i.e. variation of refractive index with wavelength) to compensate. The prism, array of prisms, or GRISM may be arranged to ensure that the spacing of channels at the SLM plane is uniform for a given spectral channel width. Each compensating prism may be associated with an array of waveguides. This can allow smaller prisms to be used (thus reducing associated absorption) and may make fabrication of the device easier.

Polarisation Diversity

Optical signals entering the WSS will generally have an undefined polarisation. If the switch optics are polarisation insensitive that this is not problematic. If the device is polarisation sensitive, such as when a nematic LCOS device is used, the incident polarisation must be aligned parallel to the liquid crystal director in order to ensure maximum diffraction efficiency. Nematic liquid crystals are rod-shaped birefringent molecules that preferentially orientate to be parallel to one another. The director of a liquid crystal is defined as the direction the long axes of the liquid crystal molecules point in, with the ordinary refractive index being perpendicular to the director and the extraordinary refractive index being parallel to the director.

Figure 14:
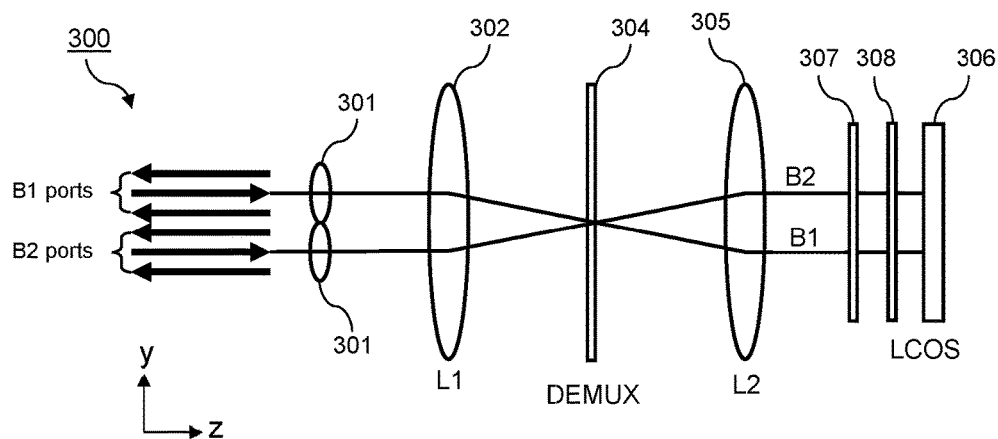
FIG. 14 shows the optical switch of FIG. 5 including a birefringent crystal and half-wave plate.

A proposed solution comprises a birefringent walkoff crystal 307 and patterned half-wave plate 308 placed before the LCOS device 306, such as shown in FIG. 14. Such a device is useful in situations where the de-multiplexing assembly (and all optics prior to the birefringent crystal) is polarisation insensitive. Beams B1, B2 incident on the birefringent crystal 307 are separated into transverse electric (TE) and transverse magnetic (TM) polarisation components. The separation of the polarisation components may be equal to offset between sub-hologram rows on the LCOS. In this example, the director of the LCOS device is oriented parallel to the TE polarisation direction, i.e. the light that is polarised parallel to the phase modulating axis of the LCOS device 306. The separated polarisation components then pass through the appropriate parts of a patterned half-wave plate 308. The patterned half-wave plate 308 is arranged such that the TM component passes through a half-wave plate and is rotated to a TE configuration whilst the TE component passes through optically isotropic portion and does not have its polarisation altered. As the beams are incident on the LCOS, all components are in the TE configuration as desired. Such spatial polarisation rotation may be achieved by other means, such as a patterned liquid crystal based polarisation rotator device. Alternatively, the LCOS device 306 itself may be patterned such that different areas have orthogonal director directions. The patterned half-wave plate 308, patterned liquid crystal based polarisation rotator device and pattern LCOS may comprise alternating rows, or an alternating 'checkerboard' pattern for receiving orthogonal polarisation components.

The beams are then independently deflected by the grating phase profile displayed on the LCOS device and retrace back through the patterned half-waveplate. The polarisation component that was rotated through 90° on the input path is rotated again through 90° by the patterned half-waveplate on the output path. The beams are finally made colinear on the return path through the waveplate, but maintain the same deflection angle. Small differences in beam propagating angle between the two components can be compensated for by adjusting one of the grating periods of the sub-holograms.

Each pair of polarisation components may be incident on adjacent rows of sub-holograms. In this case, there will therefore be twice the number of sub-hologram rows as there are incident beams. In the arrangement shown in FIG. 14, the birefringent crystal 307 and half-wave plate 308 are adjacent to each other and adjacent to the LCOS device 306. This need not be the case as the birefringent crystal 307 and patterned half-wave plate 308 may be interposed at any point between the last of the polarisation insensitive optics and the LCOS device 306.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A multiple wavelength band optical switch configured to receive an input optical signal and output an output optical signal, the input optical signal comprising light in a first wavelength band and light in a second wavelength band, the optical switch comprising
   a liquid crystal on silicon spatial light modulator controllable to direct or attenuate light in the first and second wavelength bands;
   an input device comprising:
      an optical demultiplexer configured to receive light and disperse the received light along a dispersion axis; and
      a light director configured to direct the light in the first wavelength band to the optical demultiplexer at a first angle of incidence and to direct the light in the second wavelength band to the optical demultiplexer at a second angle of incidence, the second angle of incidence being different from the first angle of incidence, the light director comprising:
         an array of input optical waveguides configured to receive the input optical signal and direct the input optical signal towards the optical demultiplexer, the array of input optical waveguides comprising:
            a first input optical waveguide configured to direct light in the first wavelength band to the optical demultiplexer; and a second input optical waveguide configured to direct light in the second wavelength band to the optical demultiplexer; and
         an input lens situated between the array of input optical waveguides and the optical demultiplexer, the input lens configured to receive light of the input optical signal from the array of input optical waveguides and steer the received light towards the optical demultiplexer;
   an array of output optical waveguides configured to output the output optical signal; and
   multiple output lenses situated between the array of output optical waveguides and the optical demultiplexer, the multiple output lenses configured to receive light from the optical demultiplexer and steer the received light towards the array of output optical waveguides,
   wherein the difference between the first and second angles of incidence causes the optical demultiplexer to output dispersed spectra of light corresponding to the first and second wavelength bands such that the dispersed spectrum of light corresponding to the first wavelength band is overlapped along the dispersion axis and separated along a switch axis relative to the dispersed spectrum of light corresponding to the second wavelength band at an incident surface of the liquid crystal on silicon spatial light modulator, the switch axis being perpendicular to the dispersion axis; and
   wherein the optical switch is configured such that light passes through the input lens only once between being received as the input optical signal at one of the input waveguides of the array of input optical waveguides and being output as the output optical signal at an output waveguide of the output optical waveguides.

2. A multiple wavelength band optical switch as claimed in claim 1, wherein the first and second angles of incidence are angled relative to one another with respect to a first axis and a second axis, the first and second axes being parallel with an incident surface of the optical demultiplexer and perpendicular to one another.

3. A multiple wavelength band optical switch as claimed in claim 2, wherein the dispersion axis is parallel with the incident surface of the optical demultiplexer and the first axis is parallel with the dispersion axis.

4. A multiple wavelength band optical switch as claimed in claim 1, wherein the array of input optical waveguides comprises a first sub-array and a second sub-array of-optical waveguides, and wherein the first sub-array of optical waveguides comprises the first input optical waveguide and the second sub-array of multiple optical waveguides comprises the second input optical waveguide.

5. A multiple wavelength band optical switch as claimed in claim 1, wherein the first input optical waveguide is spatially offset from the second input optical waveguide along a first axis and a second axis, the first and second axes being parallel with an incident surface of the optical demultiplexer and perpendicular to one another.

6. A multiple wavelength band optical switch as claimed in claim 1, wherein the optical waveguides in the first and second sub-arrays of multiple optical waveguides are arranged in one of: a linear or a rectangular pattern.

7. A multiple wavelength band optical switch as claimed in claim 1, where each optical waveguide comprises an optical fibre.

8. A multiple wavelength band optical switch as claimed in claim 1, wherein the optical demultiplexer comprises a diffraction grating or a prism.

9. A multiple wavelength band optical switch as claimed in claim 8, wherein the optical demultiplexer comprises the diffraction grating, and the dispersion axis is perpendicular to gratings of the diffraction grating.

10. A multiple wavelength band optical switch as claimed in claim 1, wherein the first wavelength band is the C-band and the second wavelength band is the L-band.

11. A multiple wavelength band optical switch as claimed in claim 1, further comprising a birefringent crystal and a polarisation rotator, wherein the birefringent crystal is arranged to divide light in the first and second wavelength bands into orthogonal polarisation components and the polarisation rotator is configured to rotate one polarisation component such that light incident on the liquid crystal on silicon spatial light modulator is substantially linearly polarised.

12. A multiple wavelength band optical switch as claimed in claim 11, wherein:
   the polarisation rotator comprises at least one of: a patterned half-wave plate, and a liquid crystal polarisation rotator; and
   the birefringent crystal and the polarisation rotator are positioned adjacent to the liquid crystal on silicon spatial light modulator.

13. A reconfigurable optical add-drop multiplexer comprising the multiple wavelength band optical switch of claim 1.

14. A multiple wavelength band optical switch as claimed in claim 1, wherein the first and second wavelength bands are non-overlapping.

15. A multiple wavelength band optical switch as claimed in claim 1, wherein the array of input optical waveguides and/or the array of output optical waveguides are arranged in a grid.

* * * * *